US012312734B2

(12) United States Patent
Wiecek et al.

(10) Patent No.: US 12,312,734 B2
(45) Date of Patent: May 27, 2025

(54) DRYER FOR DRYING DRY MATERIALS, ESPECIALLY TEXTILES

(71) Applicants: Tadeusz Max Wiecek, Cologne (DE); Elzbieta Wiecek, Cologne (DE); Natalie Gesch, Pulheim (DE)

(72) Inventors: Tadeusz Max Wiecek, Cologne (DE); Elzbieta Wiecek, Cologne (DE); Natalie Gesch, Pulheim (DE)

( * ) Notice: Subject to any disclaimer, the term of this patent is extended or adjusted under 35 U.S.C. 154(b) by 738 days.

(21) Appl. No.: 17/523,964

(22) Filed: Nov. 11, 2021

(65) Prior Publication Data

US 2022/0145523 A1 May 12, 2022

(30) Foreign Application Priority Data

Nov. 12, 2020 (DE) ..................... 10 2020 129 945.1

(51) Int. Cl.
*D06F 58/20* (2006.01)

(52) U.S. Cl.
CPC .......... *D06F 58/206* (2013.01); *D06F 58/203* (2013.01)

(58) Field of Classification Search
CPC ........ D06F 58/206; D06F 58/203; F26B 3/04; F26B 21/005; F26B 23/002
USPC ........................................................... 34/411
See application file for complete search history.

(56) References Cited

U.S. PATENT DOCUMENTS 4,345,384 A * 8/1982 Pagnozzi .................. F26B 3/00 34/76
4,601,115 A * 7/1986 Draper .................. F26B 23/002 34/468
2013/0180125 A1 * 7/2013 Shu ........................ D06F 58/24 34/406

FOREIGN PATENT DOCUMENTS

DE 3641665 A1 6/1988
DE 102006003552 A1 5/2007
DE 202009013968 U1 3/2010
DE 102012107368 A1 2/2014
EP 0505677 A1 9/1992
JP 2005241239 A 9/2005
JP B970731 B2 9/2007
WO 2011096812 A1 8/2011

* cited by examiner

*Primary Examiner* — Jessica Yuen
(74) *Attorney, Agent, or Firm* — CANTOR COLBURN LLP

(57) ABSTRACT

A dryer for drying dry materials having heating and cooling chambers, wherein the two chambers are sealed gas-tight to each other and/or to the outside environment, a connecting line that fluidically connects the chambers to each other and has a closing valve, a vacuum pump that is actively connected to the cooling chamber, a heat pump that is actively connected to the two chambers, and a steam generator which feeds generated steam via a steam line into the heating chamber, The steam mixes with moisture of the dry materials in the heating chamber and the resulting moist steam is supplied to the cooling chamber via the connecting line, wherein positive pressure is generated through evaporation and negative pressure is produced through the condensation such that a pressure difference is produced between the heating and cooling chambers, and wherein the vacuum pump pumps dry air from the cooling chamber as required.

4 Claims, 1 Drawing Sheet

34 30 26 28 32 24 56 54 52 20 38 40 36 22 48 44 46 42 50

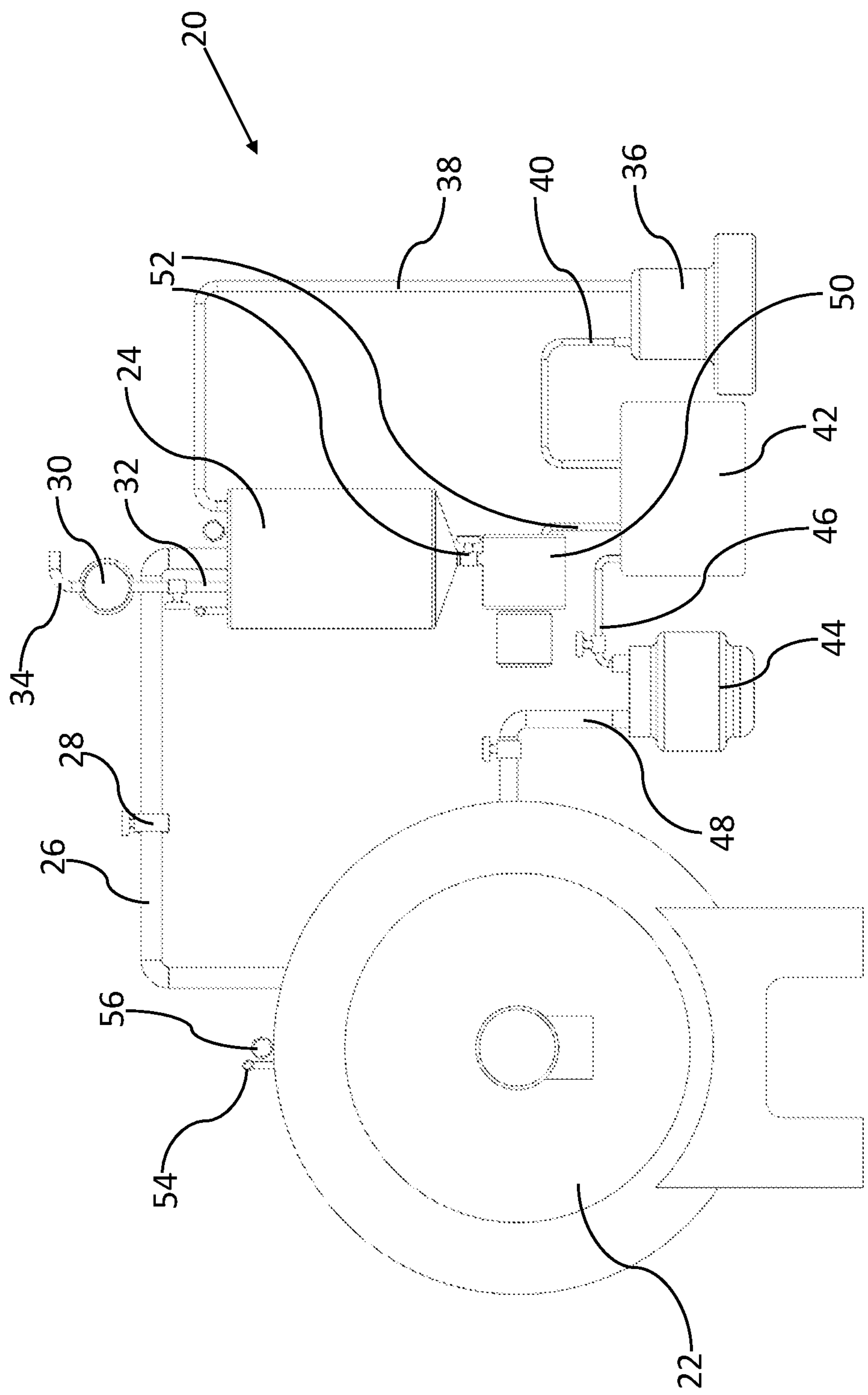
20
38
40
36
52
50
24
42
30
32
46
34
44
28
48
26
56
54
22

DRYER FOR DRYING DRY MATERIALS, ESPECIALLY TEXTILES

CROSS-REFERENCE TO RELATED APPLICATIONS

This application is related to and claims the benefit of German Patent Application No. 10 2020 129 945,1, filed on Nov. 12, 2020, the contents of which are herein incorporated by reference in their entirety.

TECHNICAL FIELD

The disclosure relates to a dryer for drying dry materials, especially textiles with a heating chamber and a cooling chamber, which can be sealed gas-tight to each other and/or to the outside environment, a connecting line that fluidically connects the chambers to each other and has a closing valve, a vacuum pump that can be actively connected to at least one of the two chambers, a heat pump that can be actively connected to both chambers, wherein the heat pump comprises a condenser and an evaporator.

Furthermore, the disclosure relates to a process for drying dry materials, especially textiles, which is carried out with this type of dryer.

BACKGROUND

In known drying processes, especially drying processes for textiles, the materials to be dried are dried through the evaporation of the liquid phase, especially through the evaporation of water. Evaporation occurs when the temperature-dependent saturated steam pressure is greater than the prevailing partial pressure of the substance evaporated into the ambient atmosphere. The evaporation process is maintained by constantly exchanging the saturated atmosphere. Evaporation is favored by the supply of thermal energy. The pressure of the ambient atmosphere can also be lowered, meaning that less thermal energy has to be supplied.

DE 36 41 665 A1 describes an energy-saving vacuum drying process and a device for drying textiles. In this process, the textiles to be dried are heated with the condenser of a heat pump and the steam condenses out on the evaporator of the heat pump. Both the evaporator and the condenser are located inside a vacuum chamber that also includes the laundry container. The boiling temperature is lowered by creating negative pressure in the vacuum chamber. One disadvantage of this process is that both the evaporation and the subsequent condensation of the moisture take place in the same vacuum container. This means that the dry materials must be prevented from coming into contact with the condensate by means of an appropriately sized container. On the other hand, a larger cooling reservoir must be provided to prevent the condensate from evaporating again until the end of the drying process. Alternatively, the condensate can be pumped out at increased energy input.

DE 20 2009 013 968 U1 describes a vacuum drying device. The dry materials are placed on drying support units in the vacuum drying device. The drying support units are connected to Peltier elements. The drying process is monitored by temperature and pressure sensors. A disadvantage of the vacuum drying device described above is that during the entire drying process the moist air has to be pumped out with a vacuum pump at increased energy input.

EP 0 505 677 A1 describes a multi-chamber vacuum belt dryer in which various pressure conditions are produced in several drying chambers. This solves the problem of limiting the final product moisture by the primarily fed moisture. However, the increased energy input for operating the vacuum pumps remains a disadvantage.

DE 10 2012 107 368 B4 describes a generic dryer that is intended in particular for drying textiles. The tumble dryer and the process for operating the tumble dryer is advantageous and also produces satisfactory results. Nevertheless, the energy input is relatively high and the drying process takes a comparatively long time.

SUMMARY

The disclosure is based on the task of providing a dryer and a process for operating such a dryer for drying dry materials, especially textiles, which do not have the disadvantages of current state-of-the-art technology. In particular, the dryer and the process should be as energy efficient as possible. The materials to be dried should be dried as gently as possible.

The disclosure solves this task by means of a dryer with the features disclosed herein and by means of a process that can be applied with this dryer with the features disclosed herein.

In addition to the heating and cooling chambers, the vacuum pump and the heat pump, the dryer according to the disclosure therefore comprises a steam generator which feeds the generated steam into the heating chamber via a steam line. The steam supplied by the steam generator removes moisture from the dry materials in the heating chamber, thus drying the dry materials. The resulting moist steam is then fed to the cooling chamber via the connecting line.

The dryer according to the disclosure is particularly suitable for drying textiles but is also suitable for quickly and efficiently drying technical components or any other objects or materials, for example.

Highly efficient drying can be achieved by using the steam as an energy carrier and the pressure differences in the various chambers. Especially when the system is essentially free of air, the energy transfer between steam and the moisture stored in the dry materials takes place directly and thus much faster. Dryer steam is much more efficient as an energy carrier, since its heat capacity is significantly higher compared to dry air of the same temperature.

The heating chamber and the cooling chamber are connected to each other at least via a connecting line in which a closing valve is arranged. The term 'closing valve' is used as a synonym for all suitable switching equipment, especially valves.

The dry materials can be stored in the heating chamber. Condensation of the evaporated moisture takes place in the cooling chamber. Furthermore, the dryer according to the disclosure comprises at least one vacuum pump that is actively connected to at least the cooling chamber. Positive pressure is created through the evaporation of moisture in the heating chamber and negative pressure is created through the condensation of moisture in the cooling chamber, thus creating a pressure difference between the heating chamber and the cooling chamber. The vacuum pump is designed to pump dry air out of the cooling chamber as required.

The heat pump is connected to the cooling chamber. By operating the heat pump, the thermal energy extracted from the cooling chamber is ultimately fed to the heating chamber and the dry materials, thus starting the evaporation of the moisture. The heating and evaporation of moisture causes the pressure inside the heating chamber to increase. At the same time, by cooling the air in this area, condensation of the moisture present in the air is achieved in the cooling chamber with a simultaneous reduction in volume and pressure. A pressure difference thus builds up between the cooling chamber and the heating chamber. The vacuum pump can additionally be used to create negative pressure in the cooling chamber at the beginning of the drying process by pumping out the air in the cooling chamber. At a predetermined pressure difference or after a predetermined drying time, the closing valve in the connecting line that connects the heating chamber and the cooling chamber is opened. Air with a high moisture content flows from the heating chamber into the cooling chamber.

The moisture starts to condense in the cooling chamber so that, as condensation continues, dry and cool air remains in the cooling chamber at an existing negative pressure which can be pumped out into the environment by the vacuum pump if necessary, without concern for moisture damage in order to adjust the negative pressure desired in the cooling chamber to a desired optimum value. When the steam condenses, its volume shrinks by a factor of approx. 800, which leads to a renewed formation of negative pressure in the cooling chamber, while at the same time steam forms in the heating chamber with a simultaneous increase in pressure for as long as there is still moisture in the dry materials. At the end of the drying process, there is essentially no more air inside the cooling and heating chamber due to vacuum pump operation, so that a constant pressure in the cooling and heating chamber indicates the end of the drying process, after the moisture has been completely evaporated and condensed. The drying process is therefore complete when both chambers, the heating chamber with the dry materials and the cooling chamber, have the same desired negative pressure.

The steam generator produces relatively dry steam, which is fed into the heating chamber via a steam line. To do so, the steam generator uses liquid supplied by the heat pump, preferably water. For this purpose, a hot water tank is provided, into which hot water originating from the heat pump is fed, which is then used by the steam generator to produce the relatively dry steam.

Preferably, the heat pump is connected to the hot water tank via a condenser or the heat line, and to the cooling chamber via an evaporator or a cold line. If the heat pump is designed with a heat or cold line, these lines comprise a heating transfer medium or a cooling transfer medium respectively. The steam generator is thus supplied with already preheated water. Preferably, a partial flow of the hot water from the heat pump can also be used directly to heat the heating chamber. According to the disclosure, the heat line can run in some sections through the housing or the housing wall of the heating chamber so that it heats the heating chamber before the water heated by the heat pump enters the hot water tank.

The hot water tank can be used as an energy store for the next drying cycle. Since the heat pump generates temperatures up to about 90° C., the water stored in the hot water tank also has a temperature of almost 90° C.

In a particularly advantageous embodiment, the condensate produced in the cooling chamber is also pumped into the hot water tank via a water pump.

It has also proven beneficial if the heating chamber is additionally heated or preheated via an additional heater, for example an electric heater, independently of the steam supplied, in order to avoid condensation on the inner walls of the heating chamber. The electric heater is preferably arranged in the housing of the heating chamber, in particular below the inserted dry materials.

The thermal energy provided by the heat pump to heat the heating chamber is thus supplied by the enthalpy of condensation with only minimal use of external energy sources.

Preferably, the drying process described can be carried out several times in succession. In particular, a predetermined number of drying processes can be carried out, or a predetermined drying time can define the number of drying processes to be carried out. In a particularly preferred embodiment, the drying time is less than half an hour. In particular, the drying process, which may be repeated several times, is preferably terminated when, after mainly complete evaporation and subsequent condensation of the moisture in the dry materials, the pressure in the heating chamber and in the cooling chamber is the same.

The greater the output of the heat pump and the area of the associated heat exchanger, the faster the drying process.

In a preferred embodiment, the heating chamber features a device for storing the dry materials, in particular for stacking or hanging the dry materials. Preferably, the heating chamber has a shelf system or a hanger system, in particular tubes or rods.

Further, the heat line of the heat pump is preferably arranged in sections within the heating chamber and is designed as a shelf system or as a hanger system. This makes it possible, for example, to store or hang laundry without any mechanical stress and to carry out crease-resistant drying. Furthermore, optimum heat transfer to the dry materials is ensured. Further, the evaporator of the heat pump or the cold line within the cooling chamber is preferably designed as cooling fins or cooling panels on which the steam can effectively condense.

In a further preferred embodiment, the pressure in the cooling chamber can be lowered with the vacuum pump, in particular below a pressure of 0.5 bar, at the beginning of the drying process. In particular, the vacuum pump preferably lowers the pressure in the cooling chamber to a pressure of 0.3 bar.

In another preferred further development of the dryer, it comprises two condensate tanks for collecting the steam that has been condensed out. These are located at the bottom of the cooling chamber or are connected to the cooling chamber. When a maximum fill level is reached or after a set period of time, at least one of the condensate tanks is sealed gas-tight to the cooling chamber and the air pressure in at least one condensate tank is adjusted to the ambient pressure. The condensate is then discharged to a hot water tank or a wastewater line by opening a valve of the condensate tank. Negative pressure is then preferably set again in the condensate tank which corresponds to the pressure in the cooling chamber. By using the condensate tanks, especially alternately, constant operation of a vacuum pump for removing the condensate is not required. At the same time, re-evaporation of the condensate is prevented.

In a preferred embodiment, at least one control valve, in particular at least one 3-way valve, is located between the condensate tanks and the cooling chamber. Depending on the fill level of the condensate tanks, the control valve directs the condensate from the cooling chamber into the first condensate tank, while the second condensate tank is sealed gas-tight to the cooling chamber and the first condensate tank, and the condensate is discharged. Further, the condensate tanks preferably have at least one valve, in particular a pressure equalization valve, via which pressure equalization between the condensate tanks and the outside environment can be established.

In a further preferred embodiment, both chambers have sensors for pressure, temperature and air moisture, thus enabling constant monitoring of the drying process. The dryer preferably features a control system that regulates the drying process depending on the measured pressure, temperature or air moisture values. In particular, the control system can ensure that the temperature in the cooling chamber does not fall below a minimum temperature, especially a minimum temperature of 2° C. Further, the control system preferably regulates the parameters of pressure and temperature, in particular pressure and temperature in the cooling chamber, thus preventing re-evaporation of the moisture condensed in the cooling chamber.

Preferably, the input parameters for the control device are provided by the sensors for pressure and/or temperature and/or air moisture. Further, by measuring a constant pressure in the heating chamber and in the cooling chamber, in particular when there is no longer any pressure difference between the heating chamber and the cooling chamber, the control system can preferably terminate the drying process, which may have been run through several times. Further, the control system preferably allows the user to control the drying process to the greatest extent possible. In particular, the user can choose between operating modes with or without pressure reduction in the cooling chamber at the beginning of the drying process. Preferably, the user can select the desired residual moisture in the dry materials or the drying time.

The dryer preferably has thermal insulation between the chambers and to the outside environment. The heating chamber also preferably has an opening that can be sealed gas-tight via a closing element, in particular a door, for filling and emptying dry materials, in particular laundry.

In a further preferred embodiment, the dryer comprises at least one air pressure equalization valve arranged between at least one of the heating or cooling chambers and the outside environment. After the drying process has been completed, pressure can be equalized between the outside environment and the heating or cooling chamber by opening the air pressure equalization valve. After the pressure in the heating chamber has been equalized, a closing element, in particular a door, of the heating chamber can be opened and the dry materials removed.

In a particularly preferred further development, the dryer has a device for discharging excess heat to the outside environment or to a heating system, with the heat preferably being transferred to the heating system via a heat exchanger. In this way, operation of the heat pump necessary for cooling the cooling chamber can be ensured without burdening the dry materials with too much heat.

In a further preferred embodiment, the dryer has a control system which is designed in particular to control the steam generator, the heat and vacuum pump, the pressure equalization valves between the heating and/or cooling chamber and the outside environment, the pressure equalization valves between the condensate tanks and the outside environment, the control valve between the condensate tanks and the cooling chamber, and the switching equipment in the lines between the heating and the cooling chambers.

In a preferred embodiment, the heating chamber comprises a rotating laundry drum or shelf. Further, the heating chamber and the cooling chamber are preferably arranged one inside the other or next to each other, or the cooling chamber is arranged below the heating chamber. In particular, the cooling chamber has a smaller volume than the heating chamber.

In a further embodiment, the cooling chamber is preferably designed as a long tube or a long hose, in particular as a spiral tube or a spiral hose, wherein the cooling chamber, which is, in particular, designed as a spiral tube or a spiral hose, is connected to the evaporator or to the cold line of the heat pump comprising a cooling transfer medium.

The vacuum pump pumps moist air from the heating chamber into the cooling chamber designed in particular as a spiral tube or hose, in which the steam in the warm air condenses out and runs off. Advantageously, no condensate tank is required in this embodiment, resulting in a very cost-saving design.

A further solution to the problem is to provide a process for drying dry materials, especially textiles, in particular with a dryer according to the features disclosed herein.

In the process according to the disclosure, the heat enthalpy required to evaporate the moisture in the dry materials is essentially supplied by a steam generator, wherein the heating chamber and the cooling chamber, which can both be sealed, in particular, gas-tight, are connected by a connecting line and can be sealed gas-tight to each other. The process is supported energetically by a heat pump connected to a heating chamber and a cooling chamber. According to the process, the dry materials to be dried are stored in the heating chamber. Evaporation of the moisture in the dry materials then takes place in the heating chamber and condensation of the moist steam in the cooling chamber. According to the process, positive pressure is created through evaporation of the moisture in the heating chamber and negative pressure is created in the cooling chamber through the condensation of the moisture, thus creating a pressure difference between the heating chamber and the cooling chamber.

Using a vacuum pump connected to the cooling chamber, the dry and cool air produced through the continuous condensation of the moisture in the cooling chamber is pumped out of the cooling chamber during the drying process without disturbing the outside environment, thus maintaining a pressure difference between the cooling chamber and the heating chamber. By operating the heat pump and the steam generator, the necessary energy input is minimized. Furthermore, the two-chamber system also separates the moisture and condensate from the dry materials, thus preventing re-moistening of the dry materials.

Preferably, the heating chamber and the cooling chamber are sealed gas-tight to each other at the beginning of the drying process via the closing valve arranged in the connecting line. Negative pressure is preferably generated in the cooling chamber at the beginning of the drying process using the vacuum pump, in particular a negative pressure of less than 0.5 bar, further in particular and even more particularly a negative pressure of 0.3 bar.

Relatively dry steam is fed from the steam generator into the heating chamber, the connecting line between the heating chamber and the cooling chamber initially remains closed via the closing valve.

Further, the temperature in the heating chamber is preferably increased and the temperature in the cooling chamber is decreased by operating the heat pump and the steam generator with the heating chambers and the cooling chambers sealed gas-tight to each other, wherein the moisture of the dry materials to be stored in the heating chamber evaporates and the pressure in the heating chamber increases due to the increased temperature in the heating chamber. At the same time, the moisture in the air of the cooling chamber condenses out. Due to the condensation of the moisture in the cooling chamber and the temperature reduction, the pressure in the cooling chamber decreases, i.e. a pressure difference between the heating chamber and the cooling chamber is created. This phase continues until the heating chamber reaches a predetermined target pressure, for example of 1.0 and 1.5 bar, preferably of 1.1 to 1.2 bar.

When a predetermined pressure difference or target pressure or a predetermined drying time is reached, the closing valve between the heating chamber and the cooling chamber is preferably opened slowly, causing the pressure between the cooling and heating chambers to equalize. In the process, the pressure in the heating chamber drops, so that the moisture present in the dry materials or in the room can already evaporate further at around 90° C. Furthermore, by opening the closing valve, air with a high moisture content passes from the heating chamber into the cooling chamber.

Moisture in the air in the cooling chamber condenses out on cooling fins or cooling panels located in the cooling chamber, so that dry and cool air remains, especially in the cooling chamber, as condensation continues. Condensation and the resulting reduction in the volume of moisture maintain a constant negative pressure in the cooling chamber.

Using the vacuum pump, dry and cool air is pumped out of the cooling chamber during the drying process, which in particular helps to maintain the pressure difference between the cooling chamber and the heating chamber. The drying process is preferably repeated several times. This drying process, which may be repeated several times, is preferably terminated when the pressure in the heating chamber and in the cooling chamber is identical.

To prevent ice forming in the cooling chamber, which would be unfavorable for the drying process, a minimum temperature, in particular a minimum temperature of 2° C., is not undercut in the cooling chamber in a preferred embodiment of the drying process.

Further, the condensate accumulated in the cooling chamber during the drying process is preferably discharged using two evacuable condensate tanks which are connected to the cooling chamber and can be sealed gas-tight to it. Preferably, after the condensate has been discharged, negative pressure is created in the condensate tanks corresponding to the negative pressure prevailing in the cooling chamber.

Discharging the condensate via the condensate tanks prevents the condensate from being re-evaporated and also eliminates the energy-intensive operation of a further pump for pumping out the condensate.

The condensate is preferably fed into a hot water tank, to which hot water produced by the heat pump is also fed. The water in the hot water tank is used by the hot water tank to generate steam.

Excess thermal energy generated during the process by the heat pump that is not required for drying is discharged to the outside environment or to a heating system via a device designed for this purpose. This ensures continuous operation of the heat pump to lower the temperature in the cooling chamber without stressing the dry materials, especially textiles, in the heating chamber by supplying too much heat.

Further, there are preferably sensors for monitoring the drying conditions in the heating chamber and in the cooling chamber, which measure, for example, the pressure, temperature or moisture in the chambers.

In a particularly preferred embodiment of the drying process, the drying process is controlled by a control system, wherein, for example, the pressure, temperature or moisture inside the heating chamber or the cooling chamber serve as input parameters for the control system. Further, the control system can preferably be used to set the desired residual moisture or the total drying time. The control system advantageously gives the user complete control over the drying process.

BRIEF DESCRIPTION OF THE DRAWING

The claimed drying process and the dryer according to the disclosure are described by means of an embodiment example below. The FIGURE at the end shows a simplified illustration of a dryer according to the disclosure.

DETAILED DESCRIPTION OF THE DRAWING

The FIGURE shows a dryer 20 for dying dry materials, especially textiles. A heating chamber 22 and a cooling chamber 24, which can be sealed gas-tight to each other and/or to the outside environment, are arranged next to one other in the shown embodiment and are fluidically connected to each other via a connecting line 26. A closing valve 28 is arranged in the connecting line 26 and can be used to seal the connecting line 26.

In the embodiment shown, a vacuum pump 30 is connected to the cooling chamber 24 via a vacuum line 32. The vacuum pump 30 also has an ambient line 34 through which air or positive pressure can be released into the environment.

A heat pump 36, which can be actively connected to the two chambers 22 and 24, which may for example comprise a condenser and an evaporator (not shown), is connected to the cooling chamber 24 via a cold line 38. Furthermore, the heat pump 36 is connected via a heat line 40 to a hot water tank 42 into which it feeds heated water.

A steam generator 44 is connected to the hot water tank 42 via an extraction line 46. Furthermore, the steam generator 44 is connected to the heating chamber 22 via a steam line 48. The steam generator 44 uses the water from the hot water tank 42 to generate steam, which is fed into the heating chamber 22 via the steam line 48 to dry the dry materials. Closing valves 28 are also arranged in the extraction line 46 and the steam line 48.

Furthermore, a water pump 50 is provided between the cooling chamber 24 and the hot water tank 42, whose condensate lines 52 can be used to feed condensate from the cooling chamber 24 into the water tank 42.

The heating chamber 22 is equipped with a pressure sensor 54 and a thermometer 56.

The disclosure is not limited to the exemplary embodiment shown, but also includes technically useful variations of the underlying disclosure.

The invention claimed is:

1. A dryer for drying dry materials, said dryer comprising:

a heating chamber, in which dry materials to be dried are to be arranged, and a cooling chamber, wherein the heating chamber and the cooling chamber are configured to be sealed gas-tight to each other and/or to the outside environment, a connecting line that fluidically connects the heating chamber and the cooling chamber to each other and has a closing valve, a vacuum pump that is actively connected to the cooling chamber, a heat pump configured to be actively connected to the heating chamber and the cooling chamber, a steam generator which feeds generated steam via a steam line into the heating chamber, wherein the steam supplied by the steam generator mixes with moisture of the dry materials in the heating chamber and the resulting moist steam is configured to be supplied to the cooling chamber via the connecting line, wherein positive pressure is configured to be generated through the evaporation of the moisture in the heating chamber, wherein negative pressure is configured to be produced through condensation of moisture in the cooling chamber such that a pressure difference is configured to be produced between the heating chamber and the cooling chamber, and wherein the vacuum pump is configured for pumping dry air out of the cooling chamber as required, wherein the heat pump is connected to the cooling chamber via a cold line and to a hot water tank via a heat line into which the heat line feeds heated water, wherein the steam generator is connected to the hot water tank via an extraction line and uses the heated water from the hot water tank to generate steam.

2. The dryer for drying according to claim 1, wherein a condensate line is provided between the cooling chamber and the hot water tank, via which condensate is configured to be fed from the cooling chamber into the water tank.

3. A process for drying materials to be dried with a dryer, the process includes the following steps:

storing in a heating chamber the materials to be dried, evaporating in the heating chamber the-moisture in the materials to be dried, condensating in a cooling chamber the steam, wherein the cooling chamber is connected to the heating chamber via a connecting line and is configured to be sealed gas-tight to the heating chamber, generating positive pressure by evaporating moisture in the heating chamber, creating negative pressure in the cooling chamber through condensation of moisture therein whereby a pressure difference is created between the heating chamber and the cooling chamber, and pumping out dry and cool air produced through the condensation step with a vacuum pump connected to the cooling chamber, wherein the heat enthalpy necessary to evaporate moisture in the dry materials is supplied by a steam generator and a heat pump connected to the heating chamber and the cooling chamber, and feeding hot water generated by the heat pump into a water tank, wherein the steam generator takes heated water from a hot water tank via an extraction line, generates steam therefrom and feeds steam into the heating chamber via a steam line.

4. The process according to claim 3, wherein condensate from the cooling chamber is configured to be fed into the water tank via a condensate line arranged between the cooling chamber and the hot water tank.

* * * * *